United States Patent
Sugita et al.

(10) Patent No.: US 11,209,792 B2
(45) Date of Patent: Dec. 28, 2021

(54) LINK INFORMATION GENERATION DEVICE, LINK INFORMATION GENERATION METHOD, AND NON-TRANSITORY COMPUTER-READABLE MEDIUM STORING LINK INFORMATION GENERATION PROGRAM

(71) Applicant: FANUC CORPORATION, Yamanashi (JP)

(72) Inventors: Yuuki Sugita, Yamanashi (JP); Hang Cui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 16/184,410

(22) Filed: Nov. 8, 2018

(65) Prior Publication Data

US 2019/0196439 A1  Jun. 27, 2019

(30) Foreign Application Priority Data

Dec. 27, 2017  (JP) .............................. JP2017-250327

(51) Int. Cl.
*G05B 19/402*  (2006.01)
*G05B 19/19*  (2006.01)

(52) U.S. Cl.
CPC .......... *G05B 19/402* (2013.01); *G05B 19/19* (2013.01); *G05B 2219/37117* (2013.01); *G05B 2219/37558* (2013.01); *G05B 2219/40527* (2013.01)

(58) Field of Classification Search
CPC ................. G05B 19/402; G05B 19/19; G05B 2219/40527; G05B 2219/37558;
(Continued)

(56) References Cited

U.S. PATENT DOCUMENTS 6,678,568 B1 * 1/2004 Yamada ................. G06T 17/00
700/145
7,547,613 B2 * 6/2009 Fukuyo .................. B23K 26/03
438/463

(Continued)

FOREIGN PATENT DOCUMENTS

CN  101870039  10/2010
CN  102865831  1/2013

(Continued)

OTHER PUBLICATIONS

Notification of Reasons for Refusal dated Nov. 19, 2019 in Japanese Patent Application No. 2017-250327.

(Continued)

*Primary Examiner* — Charles R Kasenge
(74) *Attorney, Agent, or Firm* — Wenderoth, Lind & Ponack, L.L.P.

(57) ABSTRACT

To generate link information containing association between machining information and/or machine information in a machining program, and an optical feature in a workpiece image. A link information generation device 1 comprises: a machining information acquisition unit 111 that acquires machining information in a machining program for a machine tool that executes machining on a workpiece W; a machine information acquisition unit 112 that acquires machine information about the machining state of the machine tool; a workpiece image acquisition unit 13 that acquires image information about the workpiece W; an optical feature setting unit 14 that sets an image area having an optical feature in the image information about the workpiece W; and a link information generation unit 15 that generates link information containing association between the image area having the optical feature, and the machining (Continued)

information and/or the machine information about a workpiece area associated with the image area.

6 Claims, 8 Drawing Sheets

(58) Field of Classification Search
CPC ........... G05B 2219/37117; G05B 2219/37555; G05B 2219/50064; G05B 19/18; G05B 19/40937
See application file for complete search history.

(56) References Cited

U.S. PATENT DOCUMENTS

| | | | | |
|---|---|---|---|---|
| 8,815,705 | B2* | 8/2014 | Kato | B23K 26/0823 |
| | | | | 438/463 |
| 9,420,160 | B2* | 8/2016 | Yoshida | G01C 11/02 |
| 10,532,430 | B2* | 1/2020 | Sampei | B23K 26/402 |
| 2008/0180697 | A1* | 7/2008 | Sawabe | B23K 26/048 |
| | | | | 356/630 |
| 2009/0311848 | A1* | 12/2009 | Hoshino | H01L 27/14683 |
| | | | | 438/463 |
| 2011/0313561 | A1* | 12/2011 | Lee | G06T 7/0004 |
| | | | | 700/166 |
| 2015/0070566 | A1* | 3/2015 | Yoshida | G01C 11/02 |
| | | | | 348/349 |
| 2016/0225134 | A1* | 8/2016 | Tanaka | G06T 7/74 |
| 2016/0297091 | A1* | 10/2016 | Komatsu | H01L 21/78 |

FOREIGN PATENT DOCUMENTS

| | | |
|---|---|---|
| JP | 7-174516 | 7/1995 |
| JP | 10-133728 | 5/1998 |
| JP | 2000-39909 | 2/2000 |
| JP | 2007-190628 | 8/2007 |
| JP | 2016-194843 | 11/2016 |
| WO | 2018/225159 | 12/2018 |

OTHER PUBLICATIONS

Office Action dated Jun. 1, 2020 in corresponding Chinese Patent Application No. 201811612630.9.

* cited by examiner

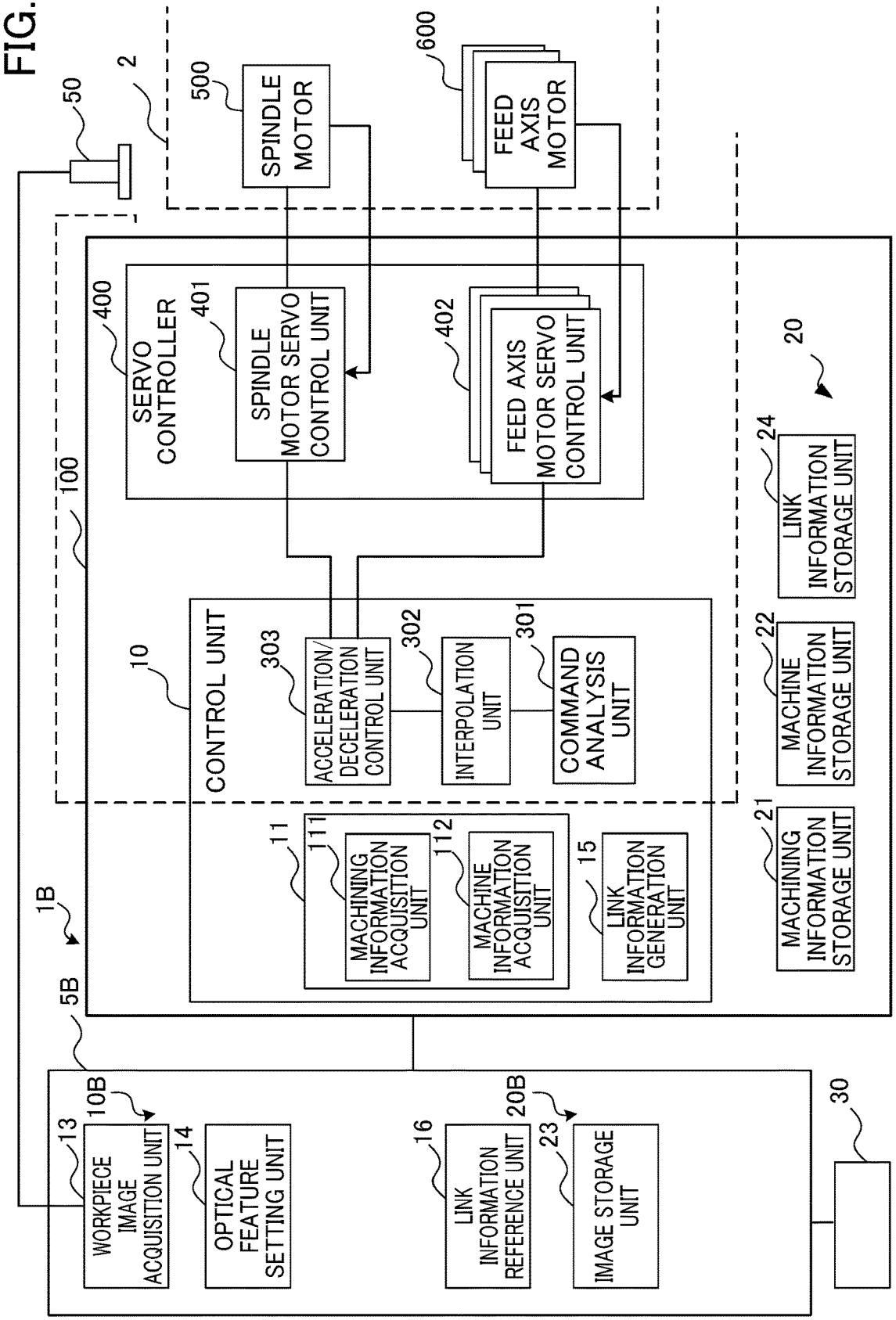

LINK INFORMATION GENERATION DEVICE, LINK INFORMATION GENERATION METHOD, AND NON-TRANSITORY COMPUTER-READABLE MEDIUM STORING LINK INFORMATION GENERATION PROGRAM

This application is based on and claims the benefit of priority from Japanese Patent Application No. 2017-250327, filed on 27 Dec. 2017, the content of which is incorporated herein by reference.

BACKGROUND OF THE INVENTION

Field of the Invention

The present invention relates to a link information generation device, a link information generation method, and a link information generation program for generating link information containing association between machining information and/or machine information in a machining program for a process of machining by an industrial machine including a machine tool or an industrial robot (hereinafter also called a "machine"), and an optical feature in a workpiece image.

Related Art

In a conventional process of production by a machine tool, the machine tool executes machining based on a machining command indicating a machining content such as a machining shape, a used tool, or a machining condition, thereby producing various types of parts. The machining command, machining information such as a history of machining by the machine tool, and machine information are stored in a database, and used for follow-up check, for example. Meanwhile, a workpiece image provides a wide variety of information about the state of a machining surface. For example, a machining program such as a tolerance command or a machining speed command, or a machine state indicating a tool type to be used or a degree of degradation of the tool, etc., is reflected in the image as an optical feature in the form of a surface quality represented by a polyhedral pattern or a scratch. Even if an area with an optical feature having a problem in a surface quality, a scratch, etc. is found in the workpiece image, however, it is hard to access a block in a program having been used for machining on this area or machine information acquired at the time of the machining. Conversely, it is also hard to grasp an area in the workpiece image in which information about a machine or a machining program having been used for machining on a workpiece W is reflected as an optical feature. Patent document 1 suggests a technique relating to this issue, for example. According to this technique, a machining robot programming device captures an image of a workpiece using a visual sensor in a machining process, a machining line in a captured workpiece image and a machining line generated in advance based on a three-dimensional model are compared, a difference between the machining lines is calculated as a variation, and a compensation instruction is added to a machining program based on the calculated variation.

Patent Document 1: Japanese Unexamined Patent Application, Publication No. 2000-39909

SUMMARY OF THE INVENTION

However, the technique described in patent document 1 is not intended to capture an optical feature in an image area in a workpiece image, and to access a block in a program having been used for machining on this image area, or machining information and/or machine information acquired at the time of the machining. Even if an area with an optical feature having a problem in a surface quality, a scratch, etc. is found in the workpiece image, it is still hard to access a block in a program having been used for machining on this area, or machining information and/or machine information acquired at the time of the machining. Conversely, it is still hard to grasp an area in the workpiece image in which information about a machine or a machining program having been used for machining on a workpiece W is reflected as an optical feature.

The present invention is intended to provide a link information generation device, a link information generation method, and a link information generation program for generating link information facilitating grasp of association as follows: access from an image area having an optical feature in a workpiece image to a block in a machining program having been used for machining on a workpiece area associated with the image area, or machining information and/or machine information acquired at the time of the machining; and conversely, grasp of an area in the workpiece image in which information about a machine or a machining program having been used for machining on a workpiece W is reflected as an optical feature.

(1) A link information generation device according to the present invention ("link information generation device 1" described later, for example) comprises: an information acquisition unit ("information acquisition unit 11" described later, for example) that acquires information about an execution position (corresponding to "execution position" described later, for example) and a machining position ("machining position" described later, for example) in a machining program for a machine tool that executes machining on a workpiece (corresponding to "workpiece W" described later, for example) by moving a tool and the workpiece relative to each other based on the machining program, the information acquisition unit comprising at least one of a machining information acquisition unit ("machining information acquisition unit ill" described later, for example) that acquires machining information ("machining information" described later, for example) at the execution position in the machining program, and a machine information acquisition unit ("machine information acquisition unit 112" described later, for example) that acquires machine information (corresponding to "machine information" described later, for example) about the machining state of the machine tool at the execution position in the machining program; a workpiece image acquisition unit ("workpiece image acquisition unit 13" described later, for example) that acquires image information about the workpiece; an optical feature setting unit ("optical feature setting unit 14" described later, for example) that sets an image area having an optical feature in the image information about the workpiece acquired by the workpiece image acquisition unit; and a link information generation unit ("link information generation unit 15" described later, for example) that generates link information containing association between the image area having the optical feature, and at least one of the machining information and the machine information about a workpiece area associated with the image area.

(2) In the link information generation device ("link information generation device 1" described later, for example) described in (1), the machining information may contain execution position information including a machining program number and a block number in the machining program, time information, parameter information including information about a command coordinate value indicated by a block in the machining program, a machining condition, and a time constant and a tolerance relating to acceleration/deceleration control, tool information, position feedback information, or speed feedback information.

(3) In the link information generation device ("link information generation device 1" described later, for example) described in (1) or (2), the machine information may contain time information, sensor data information, or servo information.

(4) In the link information generation device ("link information generation device 1" described later, for example) described in any one of (1) to (3), the optical feature setting unit ("optical feature setting unit 14" described later, for example) may divide the image information about the workpiece based on designated area division information, and set an optical feature quantity in an area resulting from the division.

(5) In the link information generation device ("link information generation device 1" described later, for example) described in any one of (1) to (4), the workpiece image acquisition unit ("workpiece image acquisition unit 13" described later, for example) may acquire the image information about the workpiece at the time of finish of a machining step designated in advance, and the link information generation unit ("link information generation unit 15" described later, for example) may associate the image area having the optical feature in the image information about the workpiece set by the optical feature setting unit with at least one of the machining information and the machine information about the workpiece area associated with the image area contained in the designated machining step and a machining step executed before the designated machining step.

(6) In the link information generation device ("link information generation device 1" described later, for example) described in any one of (1) to (4), the workpiece image acquisition unit ("workpiece image acquisition unit 13" described later, for example) may acquire the image information about the workpiece at the time of finish of a preset machining step, and the link information generation unit ("link information generation unit 15" described later, for example) may associate the image area having the optical feature in the image information about the workpiece set by the optical feature setting unit with at least one of the machining information and the machine information about the workpiece area associated with the image area contained only in the preset machining step.

(7) A link information generation method according to the present invention is executed by one, or two or more computers. The method comprises: an information acquisition step of acquiring information about an execution position (corresponding to "execution position" described later, for example) and a machining position ("machining position" described later, for example) in a machining program for a machine tool that executes machining on a workpiece by moving a tool and the workpiece relative to each other based on the machining program, the information acquisition step comprising at least one of a machining information acquisition step of acquiring machining information ("machining information" described later, for example) at the execution position in the machining program, and a machine information acquisition step of acquiring machine information ("machine information" described later, for example) about the machining state of the machine tool at the execution position in the machining program; a workpiece image acquisition step of acquiring image information about the workpiece; an optical feature setting step of setting an image area having an optical feature in the image information about the workpiece acquired in the workpiece image acquisition step; and a link information generation step of generating link information containing association between the image area having the optical feature, and at least one of the machining information and the machine information about a workpiece area associated with the image area.

(8) A link information generation program according to the present invention causes one, or two or more computers to execute: an information acquisition step of acquiring information about an execution position ("execution position" described later, for example) and a machining position ("machining position" described later, for example) in a machining program for a machine tool that executes machining on a workpiece by moving a tool and the workpiece relative to each other based on the machining program, the information acquisition step comprising at least one of a machining information acquisition step of acquiring machining information ("machining information" described later, for example) at the execution position in the machining program, and a machine information acquisition step of acquiring machine information ("machine information" described later, for example) about the machining state of the machine tool at the execution position in the machining program; a workpiece image acquisition step of acquiring image information about the workpiece; an optical feature setting step of setting an image area having an optical feature in the image information about the workpiece acquired in the workpiece image acquisition step (including setting by following an image processing program, setting through designation by a human, and setting through machine learning); and a link information generation step of generating link information containing association between the image area having the optical feature, and at least one of the machining information and the machine information about a workpiece area associated with the image area.

The present invention is capable of generating link information facilitating grasp of association as follows: access from an image area having an optical feature in a workpiece image to a block in a machining program having been used for machining on a workpiece area associated with the image area, or machining information and/or machine information acquired at the time of the machining; and conversely, grasp of an area in the workpiece image in which information about a machine or a machining program having been used for machining on a workpiece W is reflected as an optical feature.

BRIEF DESCRIPTION OF THE DRAWINGS

FIG. 10 is a schematic view showing the entire system configuration of a link information generation device 1B according to a third embodiment.

DETAILED DESCRIPTION OF THE INVENTION

First Embodiment

Figure 1:
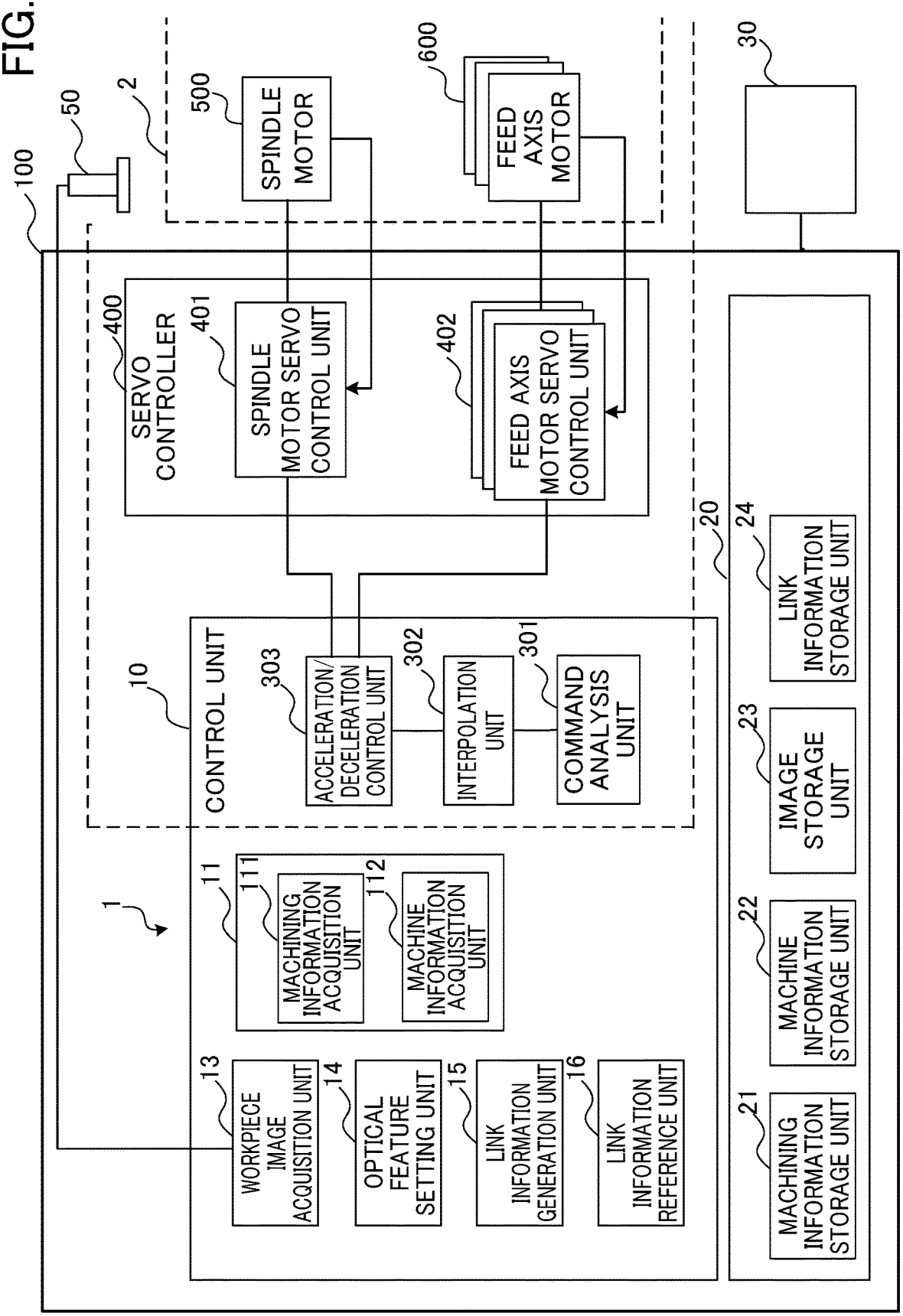
FIG. 1 is a schematic view showing the entire system configuration of a link information generation device 1 according to a first embodiment.

An example of an embodiment of the present invention will be described next. FIG. 1 is a schematic view showing the entire system configuration of a link information generation device 1 according to a first embodiment. The link information generation device 1 according to the first embodiment is incorporated in a controller 100 that controls drivers such as a servo motor and a linear motor constituting a machine tool 2. The link information generation device 1 acquires an execution position (a program number of a machining program, a machining step number and a block number in the machining program, for example) and a machining position (the coordinate value of a tool path in a machine coordinate system, for example) in the machining program for a machine tool that executes machining on a workpiece by moving a tool and the workpiece relative to each other based on the machining program. The link information generation device 1 further acquires machining execution information at the execution position and/or machine information about the machining state of the machine tool at the execution position, and stores the acquired information into a storage unit 20. The link information generation device 1 is an information processor (computer) that captures (acquires) image information about the workpiece using a camera 50 (image sensor) provided at a predetermined position at the time of finish of a preset machining step, calculates or sets a block image area having an optical feature in the image information about the workpiece, and generates link information containing association of the block image area having the optical feature with an execution position in the machining program for a workpiece area associated with the block image area, machining execution information at the execution position, and machine information at the execution position. The machining execution information and/or the machine information may be acquired together with time information.

<Machine Tool>

The machine tool 2 is a three-axis machine, for example, and includes a spindle motor 500 and a feed axis motor 600. The spindle motor 500 rotates a tool such as a ball endmill. The feed axis motor 600 includes three motors for an X-axis direction, a Y-axis direction, and a Z-axis direction. The motors for the X-axis direction and the Y-axis direction linearly move a table on which a substrate for machining on a workpiece is placed in the X-axis direction and the Y-axis direction respectively through a ball screw, for example. The motor for the Z-axis direction linearly moves the tool or the table in the Z-axis direction. The foregoing configuration is not the limited configuration of the three-axis machine. For example, the table may be moved linearly in the X-axis direction, the Y-axis direction, and the Z-axis direction while the tool is fixed. Alternatively, the tool may be moved linearly in the X-axis direction, the Y-axis direction, and the Z-axis direction while the table is fixed. The configuration of the three-axis machine is well known to a person in the art and will not be described in detail and is not shown accordingly. A machine to be controlled by the link information generation device 1 (controller) is not limited to a machine tool. For example, a machine to be controlled may be an industrial machine such as an industrial robot.

<Controller 100>

As described above, the link information generation device 1 is incorporated in the controller 100. The components of the link information generation device 1 will be described later. Components briefly described herein relate to numerical control over the machine tool 2. For example, a control unit 10 includes a command analysis unit 301, an interpolation unit 302, and an acceleration/deceleration control unit 303. The command analysis unit 301 sequentially reads blocks containing movement commands along the X axis, the Y axis, and the Z axis from a machining program, analyzes the read blocks, generates movement command data containing a movement command along each axis based on a result of the analysis, and outputs the generated movement command data to the interpolation unit 302.

The interpolation unit 302 generates interpolation data containing points on a command path calculated by interpolation in an interpolation cycle based on a movement command given in the movement command data output from the command analysis unit 301. The acceleration/deceleration control unit 303 executes acceleration/deceleration processing based on the interpolation data output from the interpolation unit 302 to calculate a speed along each axis in each interpolation cycle, and outputs data resulting from a result of the calculation to a spindle motor servo control unit 401, and three feed axis motor servo control units 402 for the X axis, the Y axis, and the Z axis in a servo control unit 400.

The spindle motor servo control unit 401 controls the spindle motor 500 based on the output from the acceleration/deceleration control unit 303. The three feed axis motor servo control units 402 for the X axis, the Y axis, and the Z axis control the three feed axis motors 600 for the X axis, the Y axis, and the Z axis based on the output from the acceleration/deceleration control unit 303. The spindle motor servo control unit 401, and the three feed axis motor servo control units 402 each include a position control unit for constituting a position feedback loop, a speed control unit for constituting a speed feedback loop, a motor driving amplifier for driving a spindle motor or a feed axis motor based on a torque command value, an operator's panel for accepting operation by a user, etc.

The spindle motor servo control unit 401 calculates a backlash compensation value using a position feedback signal output from a position detector such as an encoder coupled to the spindle motor 500 and a position command output from the control unit 10, and compensates for the position command. Each of the three feed axis motor servo control units 402 calculates a backlash compensation value using a position feedback signal output from a position detector such as an encoder coupled to a corresponding one of the three feed axis motors 600 and a position command output from the control unit 10, and compensates for the position command. A configuration for numerical control over the machine tool 2 is well known to a person in the art and will not be described in detail and is not shown accordingly.

<Link Information Generation Device 1>

The link information generation device 1 incorporated in the controller 100 will be described next. As shown in FIG. 1, the link information generation device 1 includes the control unit 10, the storage unit 20, a display unit 30, and the camera 50. The control unit 10 is to control the link information generation device 1 entirely. The control unit 10 reads various programs (called a "link information generation program" collectively) from the storage unit 20 and executes the read programs appropriately, thereby fulfilling various functions of this embodiment. The control unit 10 may be a CPU. The control unit 10 includes an information acquisition unit 11, a workpiece image acquisition unit 13, an optical feature setting unit 14, a link information generation unit 15, and a link information reference unit 16. The information acquisition unit 11 includes a machining information acquisition unit 111 and a machine information acquisition unit 112. These functions will be described in detail later.

As described above, the storage unit 20 stores programs, etc. Further, the storage unit 20 includes a machining information storage unit 21, a machine information storage unit 22, an image storage unit 23, and a link information storage unit 24. The machining information storage unit 21 stores machining information described later. The machine information storage unit 22 stores machine information described later. The image storage unit 23 stores a workpiece image and a block image area having an optical feature described later. The link information storage unit 24 stores link information described later.

The display unit 30 is configured using a display device such as a liquid crystal display (LCD), for example, and used for displaying results of various types of processing by the link information generation device 1, a workpiece image, a link information, etc.

The camera 50 is provided at a predetermined position. The camera 50 captures an image of a workpiece W in response to a request from the link information generation device 1, and transmits information about the image to the link information generation device 1.

The functional units of the control unit 10 relating to the link information generation device 1 will be described next. In the description given below, the information acquisition unit 11 (machining information acquisition unit 111 and machine information acquisition unit 112) is described as a unit to acquire time information. As described above, however, acquisition of time information is optional.

[Information Acquisition Unit 11]

The information acquisition unit 11 acquires information about an execution position (a program number of a machining program, and a machining step number and a block number in the machining program, for example) and a machining position (the coordinate value of a tool path in a machine coordinate system, for example) in the machining program for a machine tool that executes machining on a workpiece by moving a tool and the workpiece relative to each other based on the machining program. Further, the information acquisition unit 11 includes at least one of the machining information acquisition unit 111 and the machine information acquisition unit 112.

[Machining Information Acquisition Unit 111]

The machining information acquisition unit 111 acquires machining information in a predetermined sampling cycle to become operation basic information about a machining program for the machine tool 2 relating to each workpiece together with time information, and stores the acquired information into the storage unit 20 (machining information storage unit 21). The machining information contains execution position information in a machining program for a machine tool relating to each workpiece (a machining program number (program ID), a machining step number, and a block number (sequence number) in the machining program, for example), and machining execution information. For example, the machining execution information may contain machining path information including a command coordinate value, a tool path, etc. indicated by a block in the machining program, parameter information about a machining condition including information about a feed speed on a machining surface, a spindle rotation number on the machining surface, use of a cutting fluid, etc., and about a time constant and a tolerance, etc. relating to acceleration/deceleration control, tool information including a tool number (tool ID), time of use of a tool, etc. designated in a tool change command, and feedback information including position feedback information, speed feedback information, etc. The machining information acquisition unit 111 may acquire the state of internal processing in the controller such as M-code corresponding to a command for auxiliary motion such as charging or not charging cutting oil, a waiting state under in-position check for positioning, etc.

The machining execution information is not limited to the foregoing pieces of information. The machining information can be classified (grouped) using the execution position information containing a machining program number, a machining step number, and a block number in the machining program relating to each workpiece. If multiple workpieces are to be machined sequentially and individually by following the same machining program, start time of the machining may be used to identify machining information about each workpiece. If there are N block numbers in a machining program, for example, the machining information can be classified (grouped) using an index n (1≤n≤N) and/or start time $t_k$ of a block in a machining program associated with this index n. An aggregate of classified (grouped) pieces of machining information can be expressed as machining information (n, $t_k$), for example. The machining information may also be classified using a machining step number and a block number relating to each workpiece.

[Machine Information Acquisition Unit 112]

The machine information acquisition unit 112 stores machine information to become operation accessory information about the machine tool 2 and time information together in a predetermined sampling cycle into the storage unit 20 (machine information storage unit 22). The machine information may contain information indicating the state of the machine tool 2 in a machining period. The information in the machining period may contain data information about various sensors and servo information, for example. Examples of information about various types of sensors include ambient temperature information, temperature information about a spindle motor, temperature information about a feed axis motor, coolant temperature information, acceleration sensor data, vibration sensor data, acoustic emission (AE) sensor data, and sound sensor data. The servo information may be information about a servo motor including a current value at a spindle motor, a current value at each feed axis motor, a load on the spindle motor, a load on each feed axis motor, spindle override, and feed axis speed override.

Before execution of machining, the machine information acquisition unit 112 can acquire information indicating the state of the machine tool 2 before the machining such as machine configuration of the machine tool 2, (cumulative) time when a tool to be used has been used in the past and/or the state of wear of the tool to be used, camera location information, and date and time of machining, for example. For acquisition of the state of the tool, a tool management table (not shown) containing cumulative time of use and/or change information about a tool diameter, etc. is preferably used and managed for each tool ID for identifying each tool installed on the machine tool 2, for example. By doing so, the state information about the tool before execution of the machining can be incorporated into the tool information acquired by the machining information acquisition unit 111. The sampling cycle of acquiring machine information may differ from the sampling cycle of acquiring machining information. Meanwhile, time information is preferably acquired from the same clock or synchronized clocks. This makes it possible to associate each piece of machine information with each piece of machining information in one machining program. For example, machine information may be classified (grouped) based on the foregoing index given to machining information. This makes it possible to conduct analysis in association with machine information acquired during execution of predetermined machining. The machine information contains different pieces of information including the state of use of a tool, temperature information about a spindle motor, temperature information about a feed axis motor, etc. Thus, the machine information may be classified more finely and stored as fine pieces of information. More specifically, the machine information may be classified finely into tool information and temperature information, for example. In the description given above, tool information including a tool number (tool ID) and time of use of a tool designated in a tool change command is acquired as machining information. Alternatively, this tool information may be acquired as tool information in the machine information.

[Workpiece Image Acquisition Unit 13]

The workpiece image acquisition unit 13 acquires image information about the workpiece W using the camera 50 in response to the occurrence of a trigger for image acquisition (at the time of finish of a machining step designated in advance), and stores the acquired image information into the storage unit 20 (image storage unit 23). More specifically, after the finish of a machining step and before the start of a next machining step, a workpiece image capture command is inserted as a trigger for image acquisition in the form of G-code into a machining program. This allows the workpiece image acquisition unit 13 to acquire the image information about the workpiece W using the camera 50 in response to this workpiece image capture command. For this acquisition, the workpiece image acquisition unit 13 preferably links a machining step number and time information having triggered the image information acquisition with the acquired image information. Examples of such a machining step include but not limited to roughing, coarse machining, finishing, grooving roughing, grooving finishing, and threading. A user can set a machining step on the workpiece W freely in response to the substance of machining in the machining step and a degree of machining on the workpiece in this machining step.

[Association Between Image Coordinate and Machine Coordinate]

Figure 2:
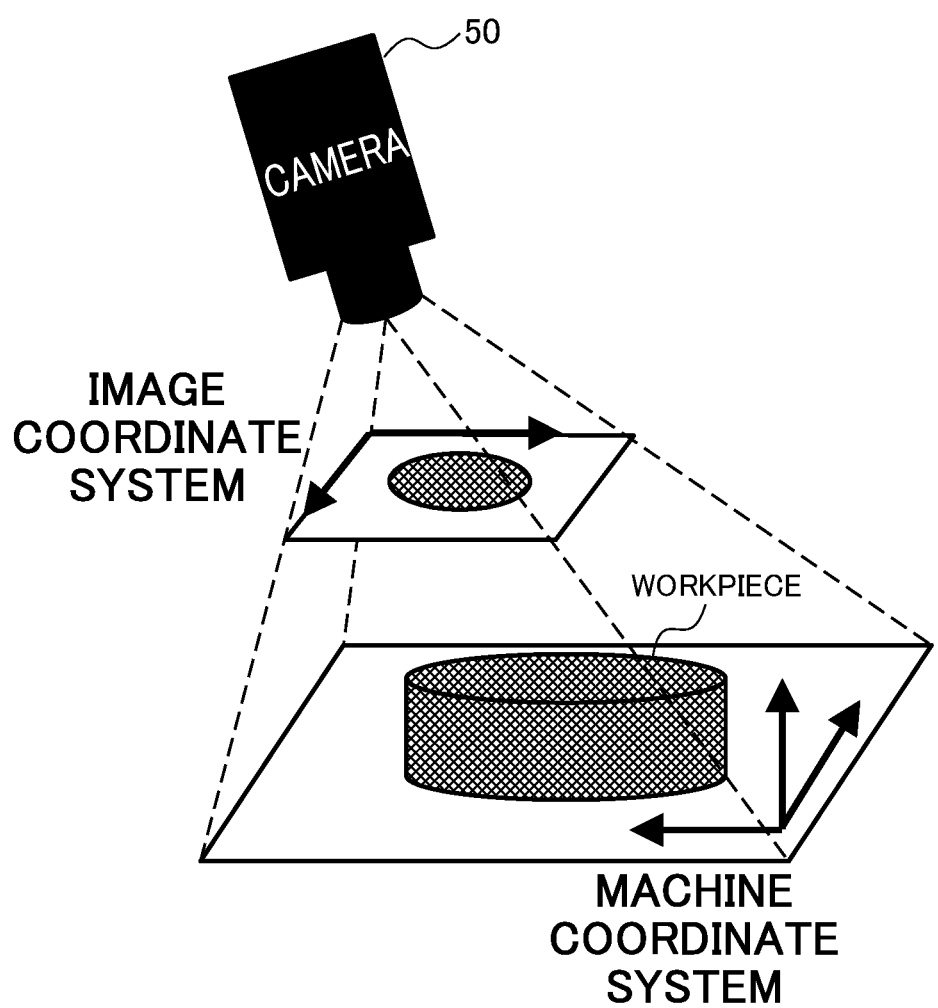
FIG. 2 shows a relationship between an image coordinate system and a machine coordinate system.

A relationship between the image coordinate of a workpiece image acquired by the workpiece image acquisition unit 13 and the machine coordinate of the machine tool 2 will be described. FIG. 2 shows a relationship between an image coordinate system and a machine coordinate system. Pixels forming a workpiece image captured by the camera 50 can be identified as image coordinates (pixel coordinate values) at the camera 50. Each pixel in the workpiece image is associated with each point on a workpiece surface, and the position of each point on the workpiece surface can be identified as a machine coordinate at the machine tool 2. Thus, for installation of the camera 50, the camera 50 captures an image of multiple taught points having known coordinate values at the machine coordinate to generate a taught point image. Based on a publicly-known calibration algorithm, a relationship ("coordinate transform function") between the machine coordinate system at the machine tool 2 and the image coordinate system at the camera 50 is calculated in advance using the machine coordinate value of each taught point and the image coordinate value of the same taught point in the image coordinate. This makes it possible to calculate an image coordinate value in a workpiece image associated with a coordinate value (machine coordinate value) indicated by a block in a machining program acquired by the machining information acquisition unit 111, or the image coordinate value of a tool path in the workpiece image associated with a tool path (machine coordinate value) on the workpiece W.

The optical feature setting unit 14 calculates or sets a block image area having an optical feature in the workpiece image acquired by the workpiece image acquisition unit 13 using the camera 50, and stores the block image area into the storage unit 20 (image storage unit 23). The optical feature setting unit 14 may be configured to calculate a block image area having an optical feature automatically using an image processing algorithm. The optical feature setting unit 14 may be configured to set a block image area extracted by an operator as a block image area having an optical feature. The optical feature setting unit 14 may also be configured to generate a learning model used for calculating an image area having an optical feature (using a neural network, for example) through machine learning of an image area having an optical feature as teacher data. Various types of publicly-known algorithms are applicable to the image processing algorithm for conducting an appearance inspection (see paragraph [0035] in Japanese Unexamined Patent Application, Publication No. 2014-55916 and Japanese Unexamined Patent Application, Publication No. 2011-232303, for example). Such algorithms will not be described in detail and are not shown accordingly.

Figure 3:
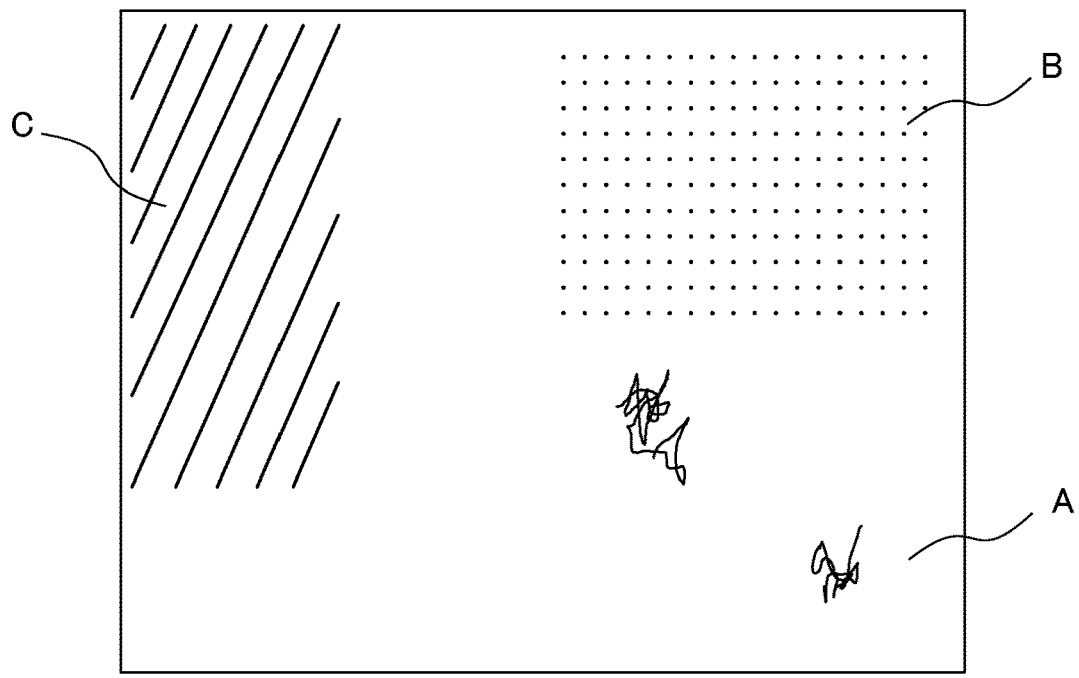
FIG. 3 shows an example of a workpiece image.
Figure 4:
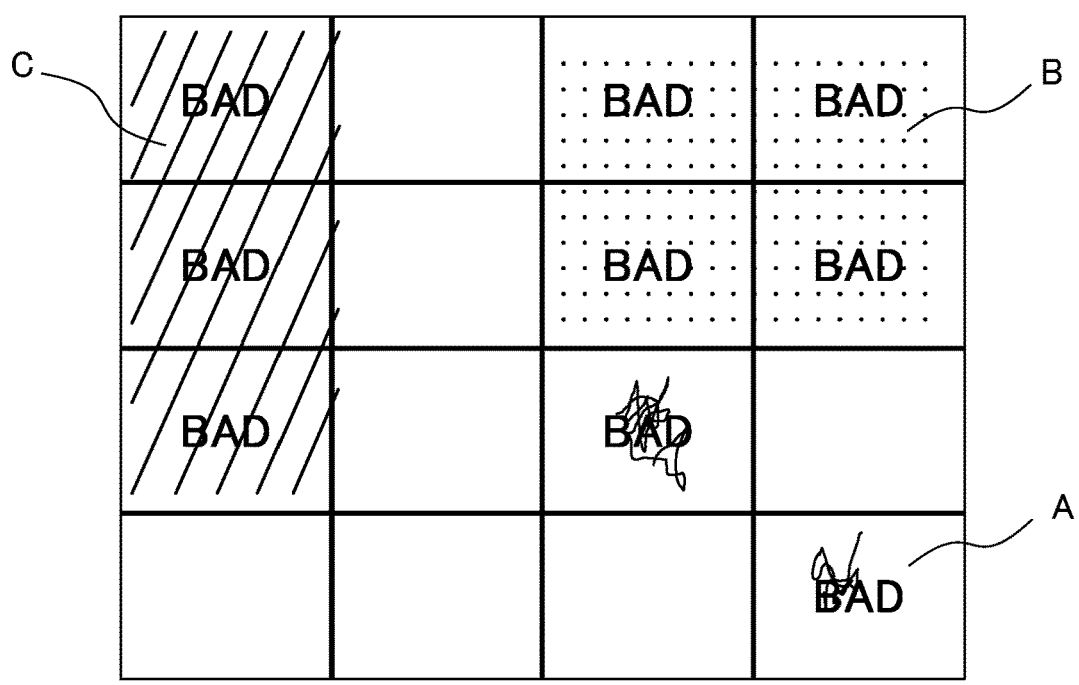
FIG. 4 shows an example in which a workpiece image is divided into multiple block image areas, and an optical feature quantity is calculated for each of the block image areas.

The optical feature setting unit 14 described in this example is to divide a workpiece image into multiple block image areas, calculate an optical feature quantity for each block image area resulting from the division, and make a pass/failure determination (good or bad) based on the calculated optical feature quantity, thereby determining the pass/failure of a result of machining on a workpiece surface associated with the block image areas. FIG. 3 shows an example of a workpiece image in which scratches A, surface machining coarseness B due to an inappropriate feed speed, and surface machining coarseness C due to an inappropriate tolerance are calculated as optical feature quantities in the workpiece image. FIG. 4 shows an example in which a workpiece image is divided into multiple block image areas to set block image areas (optical feature quantities) having optical features. As shown in FIG. 4, the optical feature setting unit 14 may divide the workpiece image into rectangular blocks at given intervals based on area division information (designation of the number of vertical divisions and that of the horizontal divisions of a workpiece image, for example) for dividing the workpiece image into multiple block image areas. The area division information is preferably designated in response to the shape of the workpiece W. The area division information may contain the shape and the size of an area resulting from the division. The shape of the area resulting from the division to be designated may not be limited to a rectangle.

The optical feature setting unit 14 assigns identification numbers to the multiple block image areas obtained by dividing the workpiece image based on the area division information. Assuming that the number of the block image areas is M (>1), each of the block image areas can be identified as {block image area (m)} ($1 \leq m \leq M$). By doing so, the optical feature setting unit 14 becomes capable of calculating and setting an optical feature quantity (m) for each block image area (m). This can be expressed as {optical feature quantity (m)} ($1 \leq m \leq M$). The expression {block image area (m)} ($1 \leq m \leq M$) can be expressed as {block image coordinate value aggregate (m)} ($1 \leq m \leq M$) showing an aggregate of image coordinate values of pixels in each block image area (m).

Dividing into the multiple block image areas in advance is not the limited way of calculation of optical feature quantities by the optical feature setting unit 14. If an algorithm such as SIFT is to be used, for example, an image is scaled at several stages for obtaining a feature point, and a scale resulting in the highest degree of definition of a feature point is calculated. In this case, an area used for calculating a feature quantity from around a feature point is to be changed in response to a scale (see U.S. Pat. No. 6,711,293, for example).

The optical feature setting unit 14 may differ timing between division of a workpiece image into multiple image areas and calculation of an optical feature quantity. More specifically, an optical feature quantity may be calculated or set for each acquired workpiece image after machining is finished. If the area division information is determined based on designation of the number of vertical divisions and that of the horizontal divisions of a workpiece image, for example, division of the workpiece image into multiple image areas basically means division of an image coordinate and does not depend on an optical feature in the workpiece image. In this case, an image coordinate may be divided before the machining.

[Link Information Generation Unit 15]

The link information generation unit 15 can identify a workpiece area on the surface of a workpiece using the foregoing coordinate transform function. The identified workpiece area is associated with {block image area (m)} ($1 \leq m \leq M$) calculated or set by the optical feature setting unit 14. For the sake of convenience, a workpiece area on the surface of the workpiece associated with each block image area (m) ($1 \leq m \leq M$) is called a workpiece area (m) and can be expressed as {workpiece area (m)} ($1 \leq m \leq M$).

Figure 5:
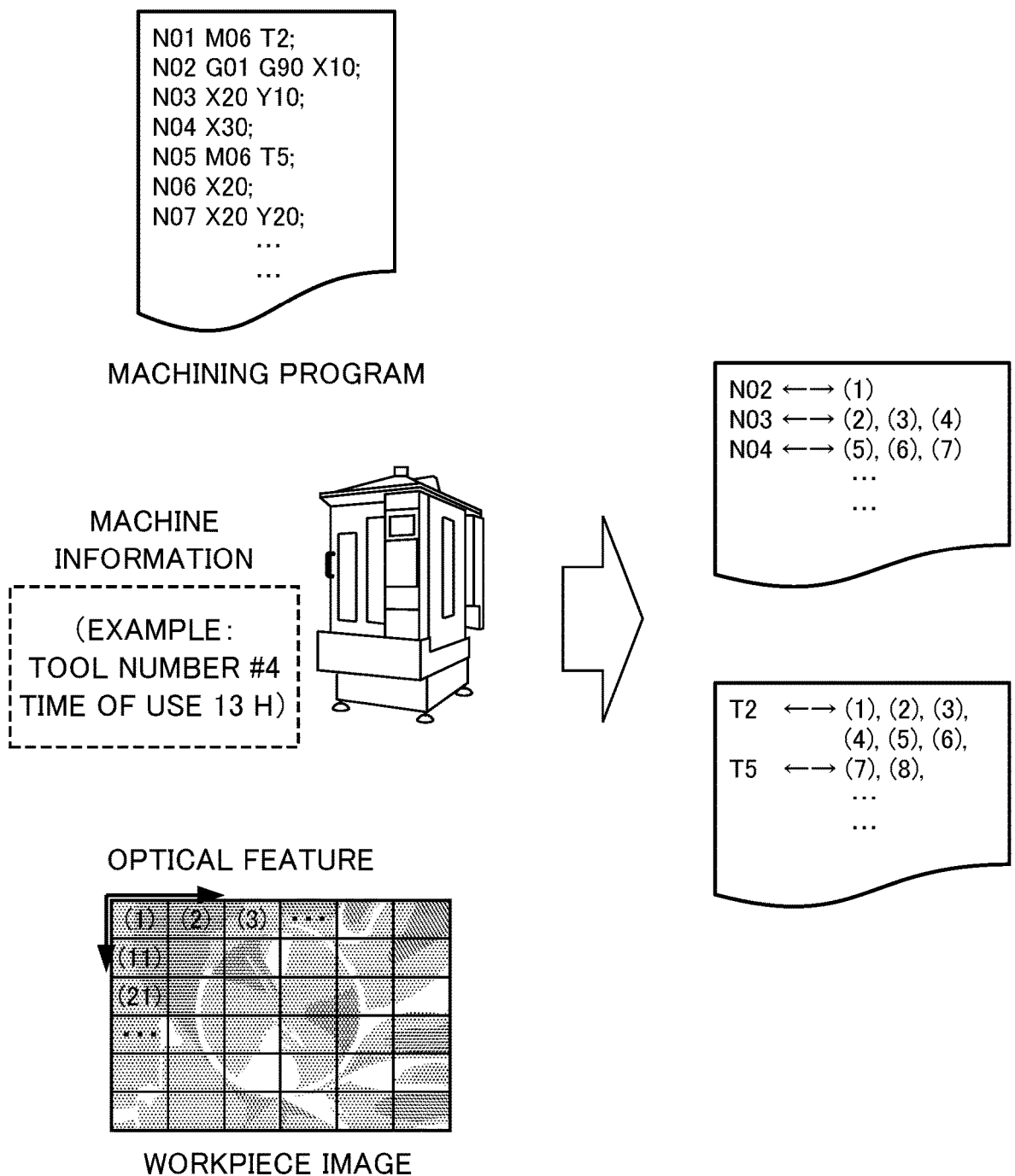
FIG. 5 shows generation of link information in outline.

The link information generation unit 15 associates each workpiece area (m) with execution position information in a machining program having been used for machining. By doing so, association is established between a block image area (m) having an optical feature, and machining information and/or machine information. Specifically, the link information generation unit 15 establishes association between a block image area (m) having an optical feature, a workpiece area (m) associated with the block image area (m), and machining information and/or machine information about a machining program having been used for machining on the workpiece area (m). FIG. 5 shows generation of link information in outline containing association between a workpiece area (m), and machining information and/or machine information about a machining program. As shown in FIG. 5, a workpiece image captured by the camera 50 at the time of finish of a designated machining step is divided into multiple block image areas, and the block image areas are identified using indexes, for example. A program block number as an execution position in the machining program is associated with a block image area. Referring to the example in FIG. 5, as a result of use of G-code (G01) containing a command for linear interpolation, a block number N02 is associated with a block image area (1), a block number N03 is associated with block image areas (2), (3), and (4), and a block number N04 is associated with block image areas (5), (6), and (7). Likewise, by referring to the example in FIG. 5, as a result of use of M-code (M06) containing a command for tool change, the block image areas (1) to (6) are associated as workpiece areas in which a tool T2 has been used, and the block image area (7) and a block image area (8) are associated as workpiece areas in which a tool T5 has been used.

In this way, link information is generated that allows grasp of association as follows: access from a block image area having an optical feature in a workpiece image to a block number in a machining program having been used for machining on a workpiece area associated with the block image area, or machining information and/or machine information acquired at the time of the machining; and conversely, grasp of a block image area in the workpiece image in which machine information or a block in the machining program having been used for machining on the workpiece W is reflected as an optical feature.

As described above, the link information generation unit 15 can associate a block image area having an optical feature in a workpiece image of the workpiece W at the time of finish of a preset machining step with machining information and/or machine information contained in the preset machining step and a machining step executed before the preset machining step. More specifically, the link information generation unit 15 generates link information containing association of one or more block image areas (m) ($1 \leq m \leq M$) with a command coordinate value or a tool path in machining information (n) in a machining program executed in the preset machining step and a machining step executed before the preset machining step, and stores the generated link information into the storage unit 20 (link information storage unit 24). Likewise, the link information generation unit 15 can generate link information containing association of one or more block image areas (m) with machine information (n) generated in the preset machining step and a machining step executed before the preset machining step, based on a command coordinate value or a tool path contained in associated machining information (n). In this description, machine information is classified (grouped) based on an index to machining information.

The link information generation unit 15 may designate the machining step number of a particular machining step or the start time of the particular machining step. By doing so, the link information generation unit 15 becomes capable of generating link information containing association of machining information (n) and machine information (n) relating only to this particular machining step with one or more block image areas (m).

The link information generation unit 15 may differ timing between execution of a process of establishing association of machining information (n) and machine information (n) with one or more block image areas (m) based on a command coordinate value or a tool path in the machining information (n), and a process of establishing association of an optical feature quantity calculated by the optical feature setting unit 14 with the machining information (n) and the machine information (n). More specifically, the process of establishing association of machining information (n) and machine information (n) with one or more block image areas (m) based on a command coordinate value or a tool path in the machining information (n) may be executed after the finish of a predetermined machining step, for example. Further, the process of establishing association of an optical feature quantity calculated by the optical feature setting unit 14 with the machining information (n) and the machine information (n) may be executed after the optical feature setting unit 14 calculates an optical feature quantity after the finish of all machining processes, for example. In this case, after the finish of a machining step and before the start of a next machining step, a link information generation command may be inserted as a trigger for link information generation in the form of G-code into a machining program. This allows the link information generation unit 15 to execute the process of establishing association of machining information (n) and machine information (n) with one or more block image areas (m) in response to the link information generation command.

[Link Information Reference Unit 16]

The link information reference unit 16 can display machining information (n) and machine information (n) on the display unit 30 based on link information. These machining information (n) and machine information (n) are associated with a block image area having a bad optical feature and set by the optical feature setting unit 14 in a workpiece image captured by the workpiece image acquisition unit 13 using the camera 50. At this time, if the workpiece image is captured after a predetermined machining step is finished, the link information reference unit 16 can display only machining information (n) and machine information (n) acquired in the predetermined machining step on the display unit 30 in response to an instruction input from a user. Conversely, if machining information (n) and machine information (n) generated in the predetermined machining step and a machining step executed before the predetermined machining step are to be displayed on the display unit 30 in response to an instruction input from a user, and if multiple pieces of machining information (n) and/or multiple pieces of machine information (n) are associated with the same block image area, the link information reference unit 16 may give precedence to machining information, etc. about the latest machining step, and display such machining information, etc. at the front on the display unit 30. The link information reference unit 16 may reverse the order of giving precedence for display, specifically, may display machining information, etc. associated with an earlier machining step at the front.

Figure 6:
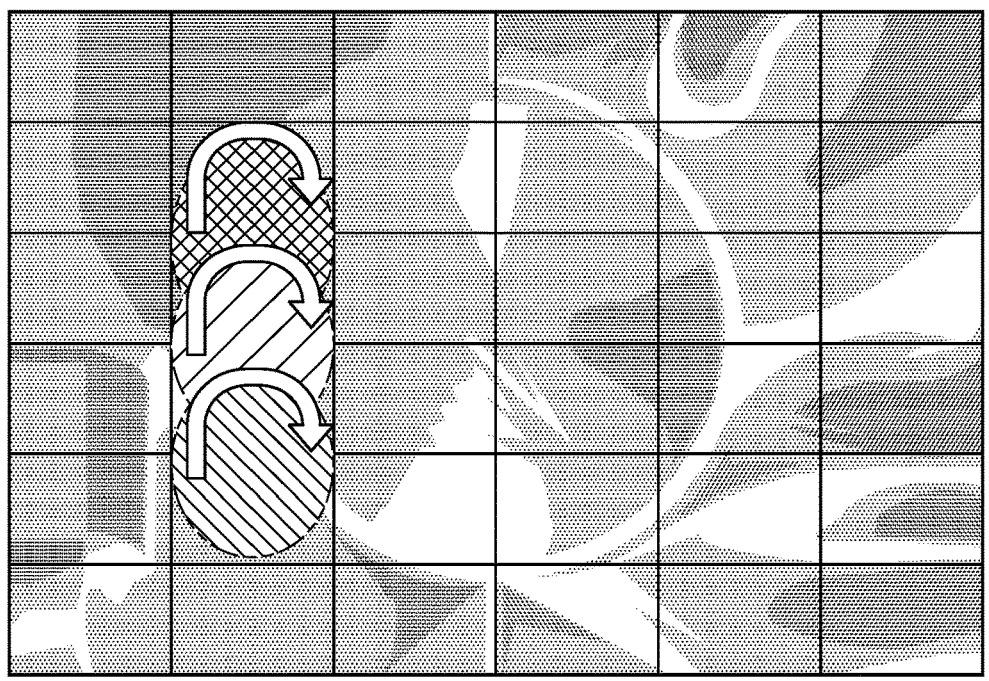
FIG. 6 shows machining information and/or machine information in a machining program associated with an image area having an optical feature and illustrated in a highlighted manner in association with the image area.
Figure 7:
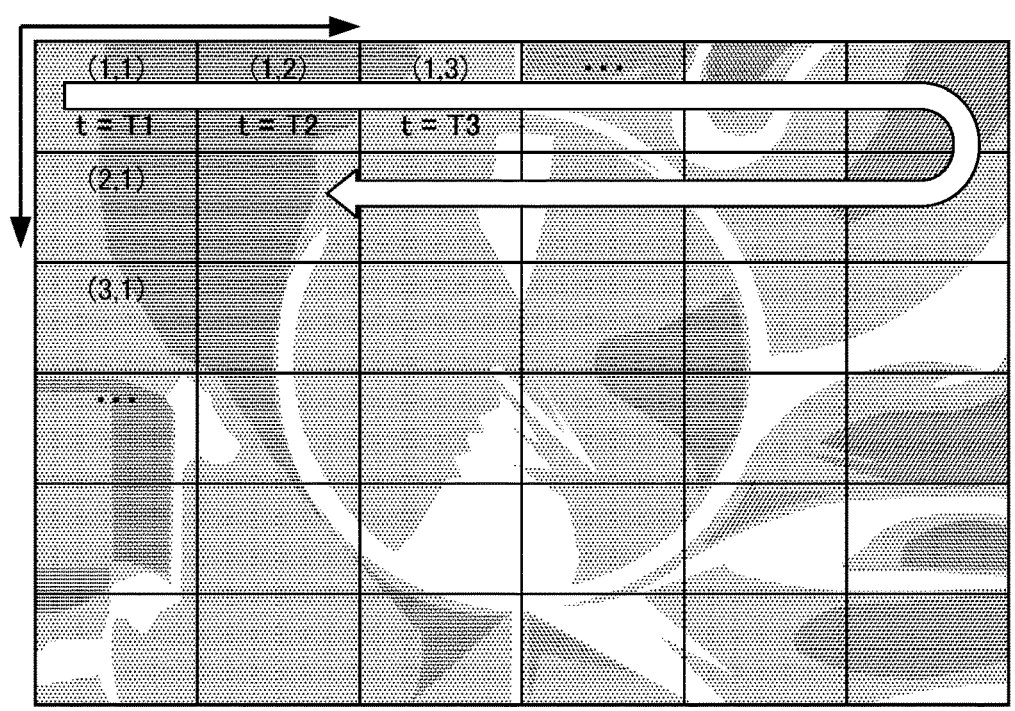
FIG. 7 shows how a workpiece image is divided so as to avoid overlap of multiple tool paths in each image area.
Figure 8:
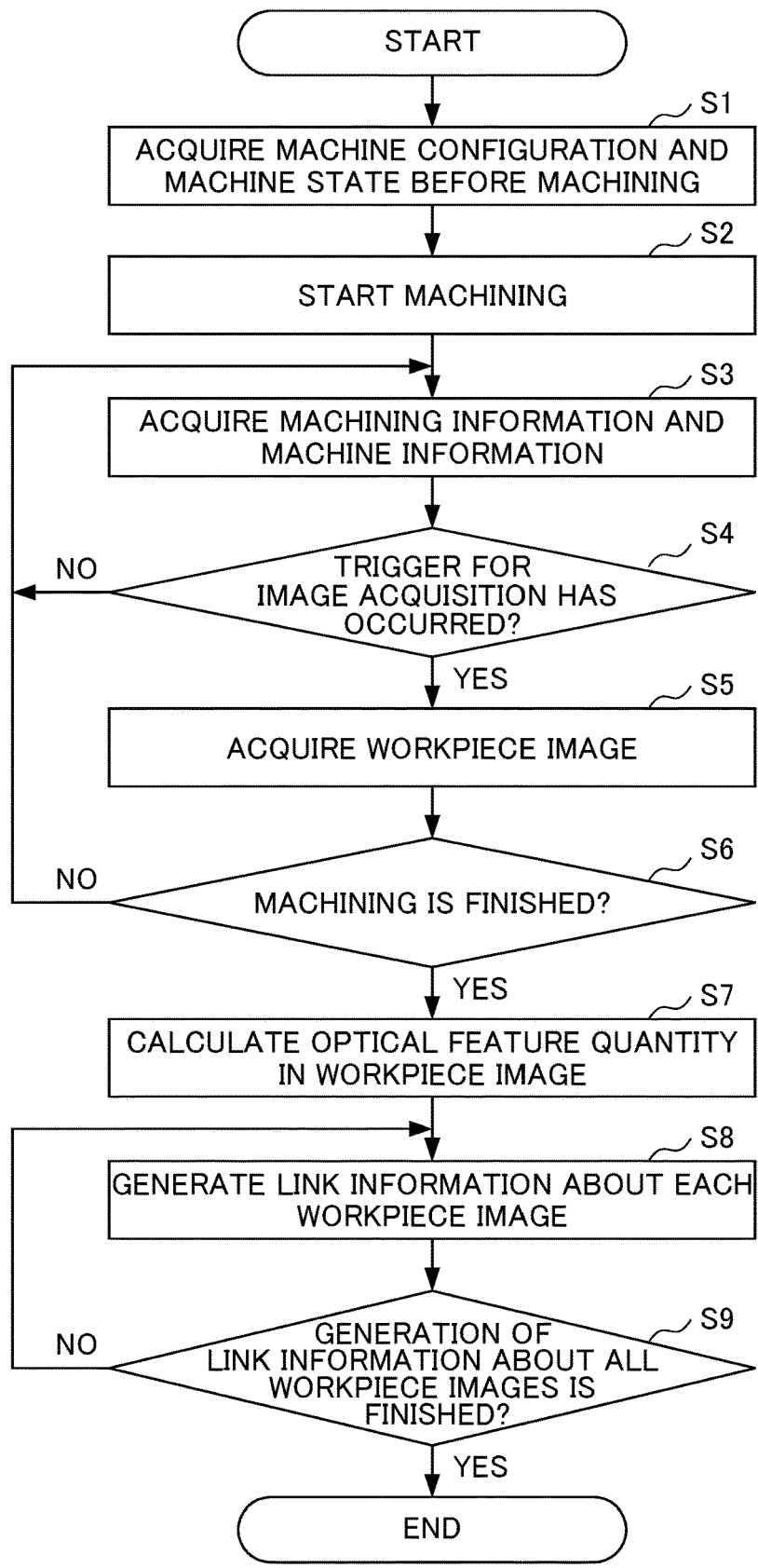
FIG. 8 is a flowchart showing the motion of the link information generation device 1.

FIG. 6 shows an example where, if machining information (n) and machine information (n) generated in the predetermined machining step and a machining step executed before the predetermined machining step are to be displayed on the display unit 30, and if multiple pieces of machining information (n) and/or multiple pieces of machine information (n) are associated with the same block image area, for example, highlight is given to machining information (not shown) and/or machine information (not shown) in a machining program associated with an image area having an optical feature to show association with this image area. By doing so, machining information and/or machine information having been used for machining can be understood visually in association with the same block image area, thereby increasing traceability to a machining path or a machining method. FIG. 7 shows how a workpiece image is divided so as to avoid overlap of multiple tool paths in a block image area. In this case, overlap between tool paths in a block image area can be avoided to establish one-to-one association between a block image area and a tool path, thereby achieving the effect of simplifying link information. The following condition should be satisfied in order to avoid overlap between tool paths in a block image area:

A distance between paths=the size of a workpiece/ the number of pixels in an image The configuration of the link information generation device 1 is as described above. The motion of the link information generation device 1 will be described next. FIG. 8 is a flowchart showing the motion of the link information generation device 1.

<Motion Flow>

The link information generation device 1 executes steps S1 to S9 shown in FIG. 8 to generate link information containing association between an image area having an optical feature in image information about the workpiece W, and machining information and/or machine information about a workpiece area associated with the image area. The process flow described below shows the motion of calculating an optical feature quantity in a workpiece image and generating link information after the finish of machining. As described above, however, the process by the optical feature setting unit 14 and the process by the link information generation unit 15 may be executed as two processes, and timing may be differed between executions of these processes.

Referring to FIG. 8, in step S1, before execution of machining, the link information generation device 1 (machine information acquisition unit 112) acquires information indicating the state of the machine tool 2 before the machining such as machine configuration of the machine tool 2, (cumulative) time when a tool to be used has been used in the past and/or the state of wear of the tool to be used, camera location information, and date and time of machining, for example.

In step S2, the link information generation device 1 starts the machining.

In step S3, the link information generation device 1 (machining information acquisition unit 111) acquires machining information in a predetermined sampling cycle to become operation basic information about a machining program for the machine tool 2 together with time information, and stores the acquired information into the storage unit 20. Likewise, the link information generation device 1 (machine information acquisition unit 112) stores machine information to become operation accessory information about the machine tool 2 and time information together in a predetermined sampling cycle into the storage unit 20.

In step S4, the link information generation device 1 determines the presence or absence of a trigger for image acquisition. In the presence of a trigger for image acquisition, the flow goes to step S5. In the absence of a trigger for image acquisition, the flow goes to step S3.

In step S5, the link information generation device 1 (workpiece image acquisition unit 13) acquires image information about the workpiece W using the camera 50.

In step S6, the link information generation device 1 determines whether all machining processes are finished. If all machining processes are finished, the flow goes to step S7. If all the machining processes are not finished, the flow goes to step S3.

In step S7, the link information generation device 1 (optical feature setting unit 14) calculates an optical feature quantity in the workpiece image acquired during the machining in response to a trigger for link information generation.

In step S8, the link information generation device 1 (link information generation unit 15) associates the optical feature quantity in the workpiece image acquired during the machining with machining information and/or machine information contained in a machining step associated with this workpiece image and a machining step executed before the associated machining step.

In step S9, if each of the acquired workpiece images has been associated with machining information and/or machine information contained in a machining step associated with each workpiece image and a machining step executed before the associated machining step, the link information generation processing is finished.

In the foregoing flow of motion described above, an optical feature quantity in a workpiece image is calculated and link information is generated after the finish of machining. Alternatively, each time a machining step is finished, association of the image coordinate of a workpiece after the finish of this machining step with machining information and/or machine information contained in the finished machining step and/or a machining step executed before the finished machining step may be established. In this case, an optical feature quantity in a workpiece image captured when the foregoing machining step is finished may be calculated, and the calculated optical feature quantity may be associated with machining information and/or machine information contained in the finished machining step and/or a machining step executed before the finished machining step at the time of finish of machining.

Effect Achieved by First Embodiment

The link information generation device 1 according to the first embodiment is capable of generating link information that facilitates grasp of association as follows: access from an image area having an optical feature in a workpiece image to a block in a machining program having been used for machining on a workpiece area associated with the image area, or machining information and/or machine information acquired at the time of the machining; and conversely, grasp of an area in the workpiece image in which machine information or the machining program having been used for machining on the workpiece W is reflected as an optical feature.

According to this embodiment, at the time of finish of a preset machining step, the link information generation device 1 can acquire image information about the workpiece W, and associate a set image area having an optical feature in a workpiece image with machining information and/or machine information contained in a machining step relating to a workpiece area associated with the set image area and machining step executed before the relating machining step. Thus, while program blocks involved in circular machining, etc. on a certain workpiece are grouped into one, for example, the group of the program blocks involved in the circular machining can be understood visually in an image area associated with this group. Further, traceability to a machining path or a machining method is increased.

According to this embodiment, at the time of finish of a preset machining step, the link information generation device 1 can acquire image information about the workpiece W, and associate a set image area having an optical feature in a workpiece image with machining information and/or machine information contained only in a machining step relating to a workpiece area associated with the set image area. Thus, by capturing a workpiece image each time a machining step such as coarse machining or finishing is executed, it becomes possible to establish association only with machining information and/or machine information in a machining program having been used for machining on a workpiece in a period from previous image capture to current image capture. By doing so, if a problem is found in a surface quality, a cause for the problem can be identified easily.

Second Embodiment

Figure 9:
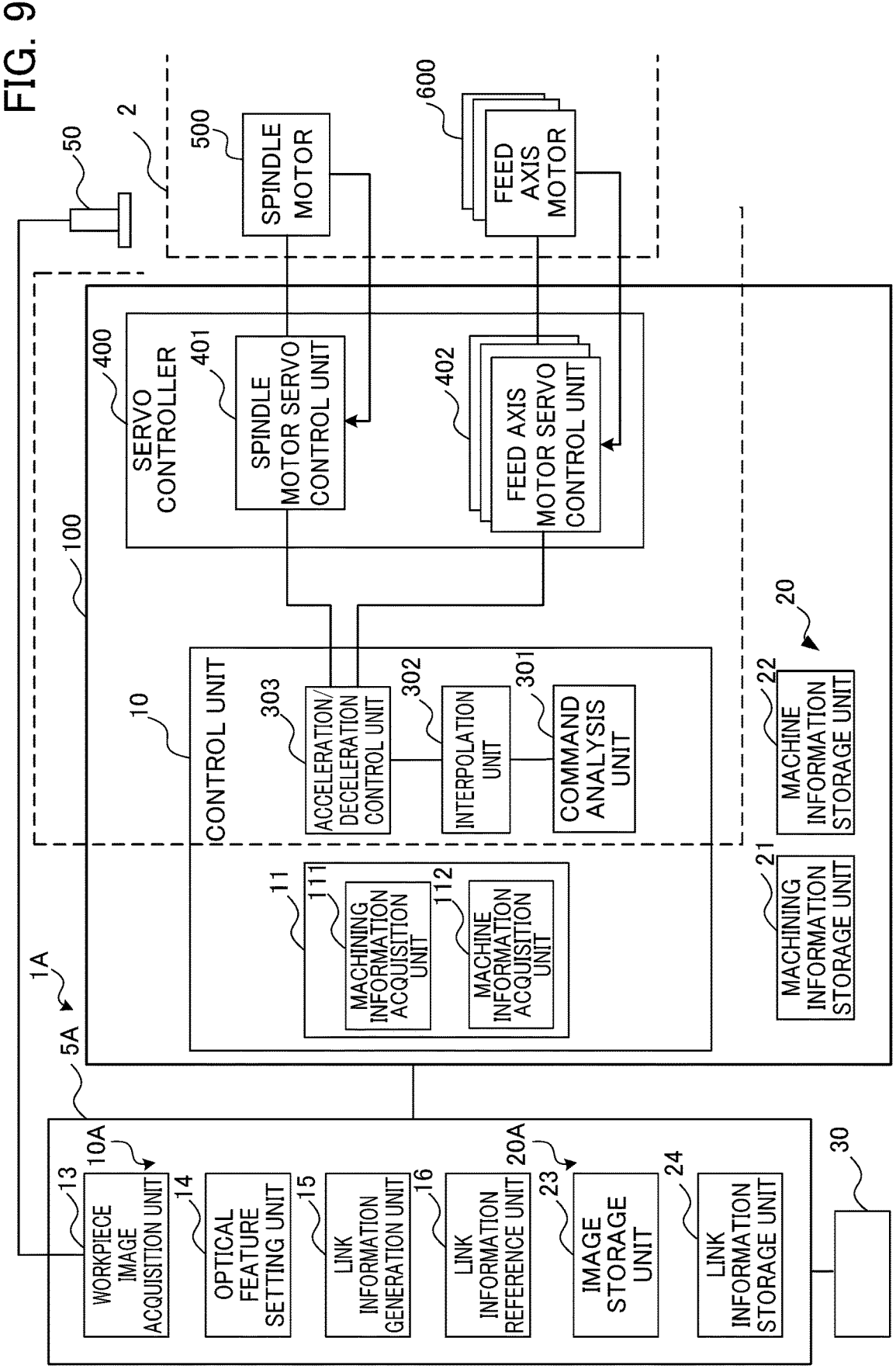
FIG. 9 is a schematic view showing the entire system configuration of a link information generation device 1A according to a second embodiment.

FIG. 9 is a schematic view showing the system configuration of a link information generation device 1A according to a second embodiment. As shown in FIG. 9, functional units relating to the link information generation device 1A are distributed to the controller 100 and a computer 5A. The controller 100 and the computer 5A are connected through a connection interface directly or through a network, and can communicate with each other. The network may be a local area network (LAN) constructed in a factory, the Internet, a public telephone network, or a combination of these networks, for example. No particular limitations are imposed on a specific communication system employed for the network, and about whether the connection is established with a wire or without a wire. In the second embodiment, the controller 100 includes the information acquisition unit 11 (machining information acquisition unit 111 and machine information acquisition unit 112) in the control unit 10. Further, the controller 100 includes the machining information storage unit 21 and the machine information storage unit 22 in the storage unit 20. The computer 5A includes the display unit 30, the camera 50, a control unit 10A, and a storage unit 20A. The control unit 10A includes the workpiece image acquisition unit 13, the optical feature setting unit 14, the link information generation unit 15, and the link information reference unit 16. The storage unit 20A includes the image storage unit 23 and the link information storage unit 24.

Third Embodiment

FIG. 10 is a schematic view showing the system configuration of a link information generation device 1B according to a third embodiment. As shown in FIG. 10, functional units relating to the link information generation device 1B are distributed to the controller 100 and a computer 5B. The controller 100 and the computer 5B are connected through a connection interface directly or through a network, and can communicate with each other. The network may be a local area network (LAN) constructed in a factory, the Internet, a public telephone network, or a combination of these networks, for example. No particular limitations are imposed on a specific communication system employed for the network, and about whether the connection is established with a wire or without a wire. In the third embodiment, the controller 100 includes the information acquisition unit 11 (machining information acquisition unit 111 and machine information acquisition unit 112) and the link information generation unit 15 in the control unit 10. Further, the controller 100 includes the machining information storage unit 21, the machine information storage unit 22, and the link information storage unit 24 in the storage unit 20. The computer 5B includes the display unit 30, the camera 50, a control unit 10B, and a storage unit 20B. The control unit 10B includes the workpiece image acquisition unit 13, the optical feature setting unit 14, and the link information reference unit 16. The storage unit 20B includes the image storage unit 23.

The present invention is not limited to the above-described embodiments. The effects described in the embodiments are merely a list of the most preferred effects resulting from the present invention. Effects achieved by the present invention are not limited to those described in the embodiments.

First Modification

The distributed configuration of the link information generation device is not limited to the configurations shown in the second embodiment and the third embodiment. Where necessary, components in the functional unit and the storage unit of the link information generation device can be distributed appropriately.

Second Modification

A machine about which link information is to be generated by the link information generation device 1 of the embodiments is not limited to machine tools including cutting machines, laser machines, and discharge machines. The embodiments are further applicable to industrial machines including industrial robots.

Third Modification

In the embodiments of the present invention, the camera 50 is provided at a predetermined position in advance and subjected to calibration. Then, association between a camera image coordinate system and a machine coordinate system at a machine tool is established. However, this is not the only way of setting association. For example, the camera 50 may be attached to a hand unit of a robot. An optimum workpiece image may be acquired by moving the camera 50 to an intended position by moving a hand. More specifically, association between a machine coordinate system and a robot coordinate system, and association between the robot coordinate system and an image coordinate system at the camera are calculated in advance. By doing so, association between the image coordinate system and the machine coordinate system can be calculated while the camera 50 is moved by the robot.

A link information generation method executed by the link information generation device 1 can be realized by software. To realize the link information generation method by software, one, or two or more programs constituting the software are installed on one, or two or more computers. These programs may be stored in a removable medium and then distributed to a user. Alternatively, these programs may be distributed by being downloaded onto a computer of the user through a network.

EXPLANATION OF REFERENCE NUMERALS

100 Controller
1, 1A, 1B Link information generation device
2 Machine tool
10, 10A, 10B Control unit
11 Information acquisition unit
111 Machining information acquisition unit
112 Machine information acquisition unit
13 Workpiece image acquisition unit
14 Optical feature setting unit
15 Link information generation unit
16 Link information reference unit
20, 20A, 20B Storage unit
21 Machining information storage unit
22 Machine information storage unit
23 Image storage unit
24 Link information storage unit
30 Display unit
50 Camera
W Workpiece

What is claimed is:

1. A link information generation device comprising:
 a processor; and
 a memory,
 wherein the processor is configured to:
  acquire information about an execution position and a machining position in a machining program for a machine tool that executes machining on a workpiece by moving a tool and the workpiece relative to each other based on the machining program;
  acquire at least one of machining information about the machining program at the execution position in the machining program having been used for machining, the machining information containing execution position information and machining execution information, and machine information about a machining state of the machine tool at the execution position in the machining program;
  acquire image information about the workpiece;
  set an image area having an optical feature in the image information about the workpiece, divide the image information about the workpiece based on designated area division information, and set an optical feature quantity in an area resulting from the division; and
  generate link information containing an association between the image area having the optical feature, and at least one of the machining information and the machine information about a workpiece area associated with the image area,
 wherein the execution position information contains a machining program number and a block number in the machining program, and
 wherein the machining execution information contains at least one of machining path information including a command coordinate value indicated by a block in the machining program, a machining condition, parameter information about a time constant and a tolerance relating to acceleration/deceleration control, tool information, feedback information including position feedback information and speed feedback information, and a state of internal processing in a controller.

2. The link information generation device according to claim 1, wherein
 the machine information contains at least one of sensor data information and servo information.

3. The link information generation device according to claim 1, wherein
 the processor is configured to acquire the image information about the workpiece at a time of finish of a machining step designated in advance, and
 the processor is configured to associate the image area having the optical feature in the image information about the workpiece with at least one of the machining information and the machine information about the workpiece area associated with the image area contained in the designated machining step and a machining step executed before the designated machining step.

4. The link information generation device according to claim 1, wherein
the processor is configured to acquire the image information about the workpiece at a time of finish of a machining step designated in advance, and
the processor is configured to associate the image area having the optical feature in the image information about the workpiece with at least one of the machining information and the machine information about the workpiece area associated with the image area contained only in the designated machining step.

5. A link information generation method executed by one, or two or more computers, the link information generation method comprising:
an information acquisition step of acquiring information about an execution position and a machining position in a machining program for a machine tool that executes machining on a workpiece by moving a tool and the workpiece relative to each other based on the machining program,
the information acquisition step comprising at least one of a machining information acquisition step of acquiring machining information about the machining program at the execution position in the machining program having been used for machining, the machining information containing execution position information and machining execution information, and a machine information acquisition step of acquiring machine information about a machining state of the machine tool at the execution position in the machining program;
a workpiece image acquisition step of acquiring image information about the workpiece;
an optical feature setting step of setting an image area having an optical feature in the image information about the workpiece acquired in the workpiece image acquisition step, dividing the image information about the workpiece based on designated area division information, and setting an optical feature quantity in an area resulting from the division; and
a link information generation step of generating link information containing an association between the image area having the optical feature, and at least one of the machining information and the machine information about a workpiece area associated with the image area area, wherein
the execution position information contains a machining program number and a block number in the machining program, and
the machining execution information contains at least one of machining path information including a command coordinate value indicated by a block in the machining program, a machining condition, parameter information about a time constant and a tolerance relating to acceleration/deceleration control, tool information, feedback information including position feedback information and speed feedback information, and a state of internal processing in a controller.

6. A non-transitory computer-readable medium storing a link information generation program for causing one, or two or more computers to execute:
an information acquisition step of acquiring information about an execution position and a machining position in a machining program for a machine tool that executes machining on a workpiece by moving a tool and the workpiece relative to each other based on the machining program,
the information acquisition step comprising at least one of a machining information acquisition step of acquiring machining information about the machining program at the execution position in the machining program having been used for machining, the machining information containing execution position information and machining execution information, and a machine information acquisition step of acquiring machine information about a machining state of the machine tool at the execution position in the machining program;
a workpiece image acquisition step of acquiring image information about the workpiece;
an optical feature setting step of setting an image area having an optical feature in the image information about the workpiece acquired in the workpiece image acquisition step, dividing the image information about the workpiece based on designated area division information, and setting an optical feature quantity in an area resulting from the division; and
a link information generation step of generating link information containing an association between the image area having the optical feature, and at least one of the machining information and the machine information about a workpiece area associated with the image area area, wherein
the execution position information contains a machining program number and a block number in the machining program, and
the machining execution information contains at least one of machining path information including a command coordinate value indicated by a block in the machining program, a machining condition, parameter information about a time constant and a tolerance relating to acceleration/deceleration control, tool information, feedback information including position feedback information and speed feedback information, and a state of internal processing in a controller.

* * * * *